United States Patent
Ishikawa et al.

(10) Patent No.: US 7,240,216 B2
(45) Date of Patent: Jul. 3, 2007

(54) IC CARD HAVING BLOCK STATE OF OPERATION AND METHOD OF PROVIDING INFORMATION SECURITY FOR THE SAME

(75) Inventors: Hidetoshi Ishikawa, Yokohama (JP);
Yukio Yamauchi, Yokohama (JP);
Kanehiro Imai, Yokosuka (JP);
Akihiro Higashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 656 days.

(21) Appl. No.: 10/012,328

(22) Filed: Dec. 12, 2001

(65) Prior Publication Data

US 2002/0073332 A1 Jun. 13, 2002

(30) Foreign Application Priority Data

Dec. 13, 2000 (JP) ............ P. 2000-379346

(51) Int. Cl.
*H04L 9/00* (2006.01)
(52) U.S. Cl. .................... 713/185; 713/182
(58) Field of Classification Search ......... 713/200, 713/173, 175; 705/41, 67
See application file for complete search history.

(56) References Cited

U.S. PATENT DOCUMENTS

| 5,003,594 | A | * | 3/1991 | Shinagawa | 713/159 |
|---|---|---|---|---|---|
| 5,012,074 | A | * | 4/1991 | Masada | 235/379 |
| 5,534,857 | A | | 7/1996 | Laing et al. | |
| 5,615,381 | A | * | 3/1997 | Iijima | 710/260 |
| 6,138,005 | A | * | 10/2000 | Park | 455/411 |
| 6,240,517 | B1 | * | 5/2001 | Nishioka | 713/201 |
| 6,779,112 | B1 | * | 8/2004 | Guthery | 713/172 |

FOREIGN PATENT DOCUMENTS

| CN | 1110892 | 10/1995 |
|---|---|---|
| EP | 0 776 141 A2 | 5/1997 |
| EP | 0 973 134 A1 | 1/2000 |
| EP | 1 074 906 A1 | 2/2001 |
| JP | 1-93877 | 4/1989 |
| WO | WO 95/01695 | 1/1995 |
| WO | WO 95/04328 | 2/1995 |

* cited by examiner

*Primary Examiner*—Nasser Moazzami
*Assistant Examiner*—Pramila Parthasarathy
(74) *Attorney, Agent, or Firm*—Oblon, Spivak, McClelland, Maier & Neustadt, P.C.

(57) ABSTRACT

Information stored in an IC card which can be set to a block state, where any functions permitted to a user authority holder is not effective and an unblock password is required to set the IC card back to an initial state, is more secured than that stored in an IC card without the block state. The IC card of the present invention is further provided with a counter counting the number of incorrect unblock passwords, and is set to a more secured state of operation where only administrative authority holder can release the IC card.

11 Claims, 6 Drawing Sheets

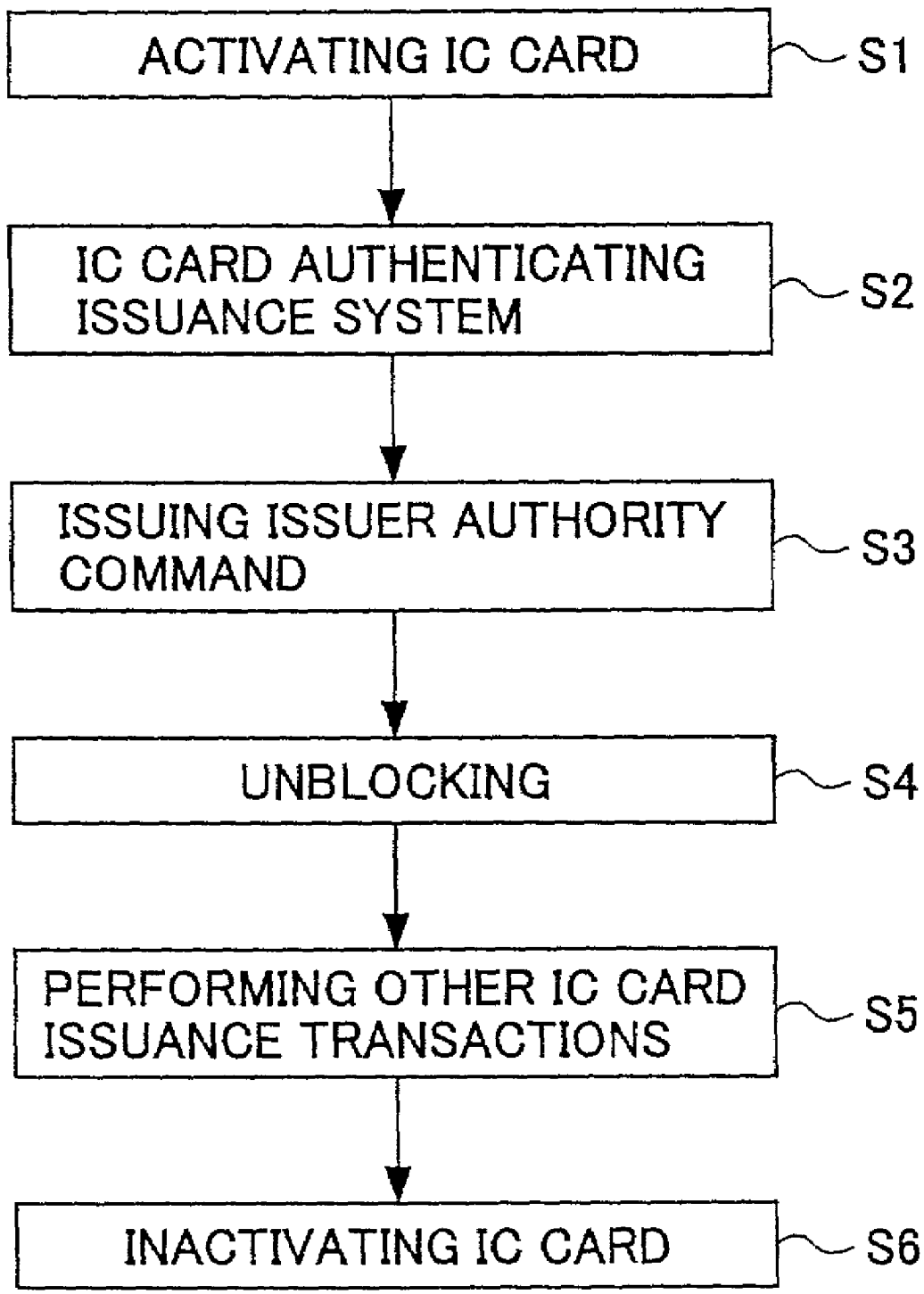

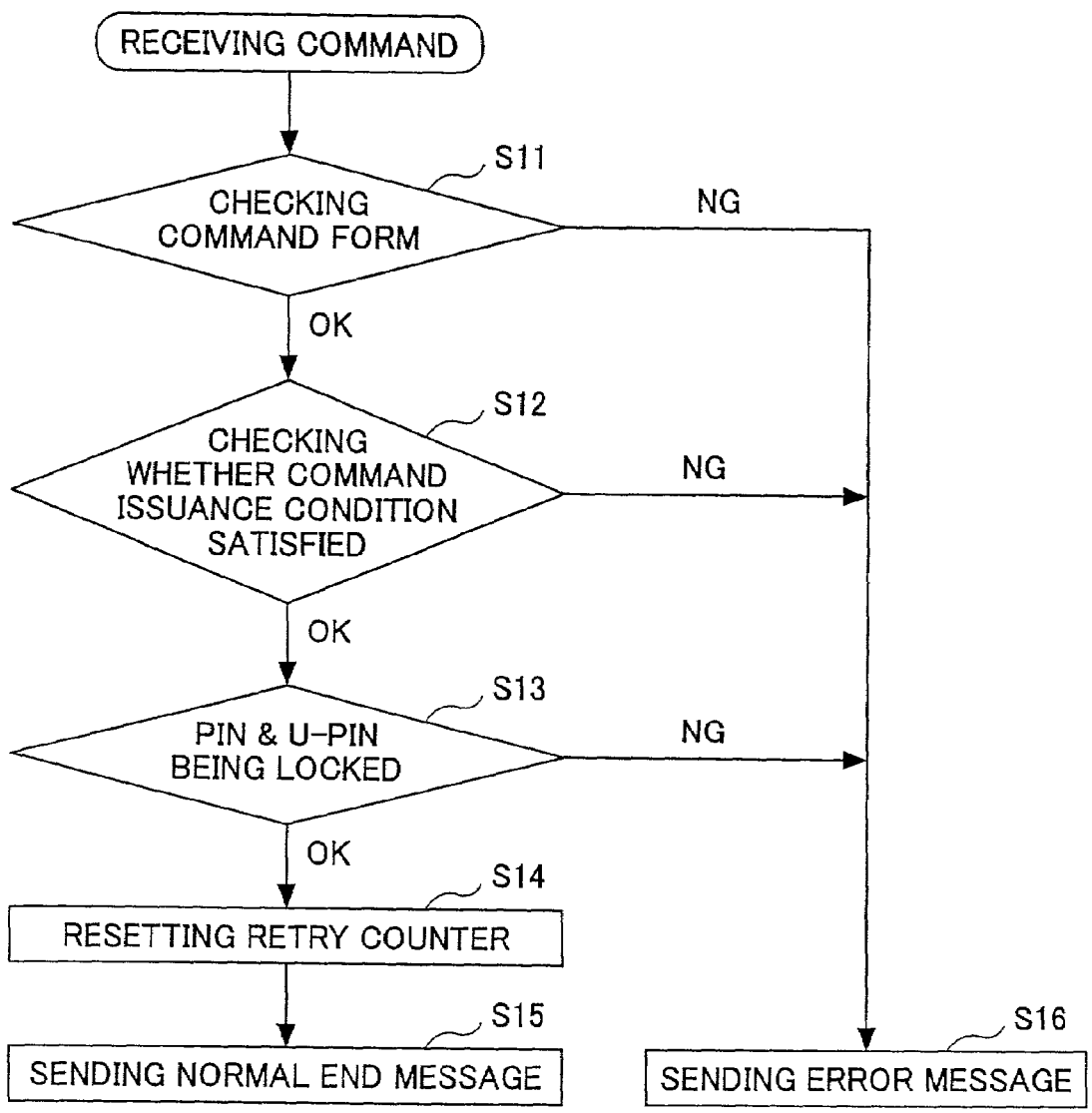

FIG.5

OPERATING SYSTEM, FILE CONTROL INFORMATION

[FUNCTIONS PERMITTED TO ADMINISTRATIVE AUTHORITY HOLDERS]

☆INTERNATIONAL MOBILE SUBSCRIBER IDENTITY

| READOUT | USER AUTHORITY REQUIRED |
|---|---|
| CHANGE | ADMINISTRATIVE AUTHORITY REQUIRED |

☆EMERGENCY CALL CODES

| READOUT | NOT RESTRICTED |
|---|---|
| CHANGE | ADMINISTRATIVE AUTHORITY REQUIRED |

[FUNCTIONS PERMITTED TO USER AUTHORITY HOLDERS]

☆PREFERRED LANGUAGES

| READOUT | NOT RESTRICTED |
|---|---|
| CHANGE | USER AUTHORITY REQUIRED |

※USER CAN SET PREFERRED LANGUAGE PRIORITY

☆ABBREVIATED DIALING NUMBERS

| READOUT | USER AUTHORITY REQUIRED |
|---|---|
| CHANGE | USER AUTHORITY REQUIRED |

※USER CAN STORE ABBREVIATED DIALING NUMBERS

☆OTHER FUNCTIONS

IC CARD HAVING BLOCK STATE OF OPERATION AND METHOD OF PROVIDING INFORMATION SECURITY FOR THE SAME

BACKGROUND OF THE INVENTION

1. Field of the Invention

The present invention generally relates to an IC card, and more particularly, to an IC card which is activated, as a function, by being provided predetermined information thereto.

The present invention further relates to an information security method for the IC card.

The present invention yet further relates to an IC card issuance device which issues the IC card to a user.

2. Description of the Related Art

In a mobile communication system proposed previously, a user is issued with an IC card having necessary information for communication, such as International Mobile Subscriber Identity, and is required to activate a mobile terminal by setting the IC card to the mobile terminal. The IC card used for such mobile communication system contains, as shown in FIG. 5, an operating system (OS) and file control information, which are used for realizing functions permitted to an administrative authority holder of the IC card and functions permitted to a user authority holder of the IC card.

The functions permitted to the user authority holder are functions generally having no effect on important information necessary for communication services, and include the readout of International Mobile Subscriber Identity, the change of Preferred Languages (Japanese and English, for example), and the readout and change of Abbreviated dialing numbers, for example. These functions permitted to the user authority holder can be activated by providing the IC card with a password (PIN) or a standard command defined by organizations, such as ISO, because the functions permitted to the user authority holder require security to a certain extent.

On the other hand, the functions permitted to the administrative authority holder generally affect the important information for the communication services, and include the change of International Mobile Subscriber Identity and the renewal of Emergency Call Codes information, such as 110 and 119 of Japan. The functions permitted to the administrative authority holder, which must maintain strict security level, are not activated unless the IC card is provided with original closed command defined by the administrator (a communication service provider) or information certifying, by an external entity, that the person accessing to the IC card has the authority to access the IC card.

By the way, IC cards described above are distributed through a distribution channel illustrated in FIG. 6, for example. The IC cards manufactured at a manufacturing plant 100 are distributed through a distribution center 110, subsidiaries 121, 122, 123, . . . business bases of the subsidiaries 131, 132, 133, . . . to the sales branches of the mobile communication provider 141, 143, 146, . . . and agents 142, 145, . . . The manufacturing plant 100 delivers the IC cards after storing, in the IC cards, an operating system (OS), a file system, and IC card issuance information such as a manufacturing number and initial value of the PIN (password), and further storing a part of information (Preferable Languages information, for example) which can be read and written by the functions permitted to the user authority holder.

The sales branches 141, 143, 146, . . . and the agents 142, 145, . . . are provided with IC card issuance devices. The sales branches and the agents store, by setting the IC cards in the IC card issuance devices, International Mobile Subscriber Identity (a telephone number, information for user identification, information for communication services subscribed by users, for example) and the password (PIN) designated by the users. The IC cards containing this information are issued to the users. The users set the IC cards in their mobile terminals, and enjoy communication services based on the subscriber information stored in the IC cards.

As described above, the IC card delivered from the manufacturing plant 100 already includes a manufacturing number, an initial value of a password (PIN), and a part of information which can be read and written by the functions permitted to the user authority holder as well as an operating system and a file system. Accordingly, the distribution of IC cards described above involves the risk of alteration since a part of information which can be read and written by the functions permitted to the user authority holder may be altered at any nodes (the distribution center 110, the subsidiaries 121, 122, 123, . . . , and business bases 131, 132, 133, . . . ) in the distribution channel.

Because the functions permitted to the user authority holder is activated by only providing a password (PIN) to the IC card, the security level of the information which can be changed by such functions is lower than that of the information which can be changed by functions permitted to the administrative authority holder. Furthermore, the manufacturing plant 100 may store the same initial value of the password (PIN) in all of IC cards for ease of issuance transaction. The alteration of information is relatively easy.

The alteration of the information which can be changed by the functions permitted to the user authority holder may not cause a serious damage in the operation of the mobile communication system. However, if information stored in an IC card is altered, a user may not be able to use a preferred function and has to delete unnecessary information stored for the alteration.

The alteration is possibly avoided if all information stored in the IC card is thoroughly checked when the IC card is issued. But the checking process takes time and lowers the efficiency of the IC card issuance service. It is of no sense that the initial information is stored at the manufacturing plant 100.

SUMMARY OF THE INVENTION

Accordingly, it is a general object of the present invention to provide a novel and useful IC card having enhanced data security during a distribution.

It is another object of the present invention to provide a method for information protection for the IC card.

It is yet another object of the present invention to provide an IC card issuance device for the IC card.

An IC card having two states of operation, an initial state and a block state, includes a memory storing first information, second information and a first retry number, a processor which performs a predetermined function in response to reception of information identical to said first information that is provided to said IC card while said IC card is in said initial state, and a counter which counts how many times information different from said first information is provided to said IC card while said IC card is in said initial state, wherein said IC card is set to said block state when a first number counted by said counter exceeds said first retry number and said IC card is set to said initial state in response to reception of information identical to said second information that is provided to said IC card while said IC card is in said block state.

While the IC card is in the initial state, functions permitted to a user authority holder become effective when a password (first information) is provided to the IC card. The IC card, however, is set to the block state, where the processor cannot perform any function permitted to a user authority holder, if the number of incorrect password inputs exceeds a predetermined maximum number (first retry number) stored in the memory. It is necessary to provide an unblock password (second information) to set the IC card back to the initial state.

To protect information stored in the IC card, the predetermined maximum number is set zero when the IC card is delivered from the IC card manufacturing plant. Accordingly, even a user authority holder cannot change the information, stored in the IC card, accessible for the user authority holder because the IC card remains in the block state of operation until the unblock password is provided by the IC card issuance terminal relative to the present invention.

To achieve some of the objects described above, according to the present invention, the present invention includes an IC card having a function which is enabled by predetermined information, wherein said function which is enabled by said predetermined information is in an unable state in an initial state, and said IC card has a means for disengaging said unable state of said function in response to a predetermined command.

The IC card is set at the initial state upon delivery from the manufacturer. A predetermined command is input to the IC card when the IC card is issued (personalized) to a user. Accordingly, the function which is enabled by predetermined information is in an unable state from the shipment from the manufacturer to the issuance to the user. The IC card is released from the unable state of the function by the means for disengaging in response to the command upon the issuance. After the disengagement, the user is able to use the function which is enabled by predetermined information.

The unable state described above is any state where the function which is enabled by predetermined information is unable to use, such as a state in which the IC card does not accept the predetermined information and a state in which the function itself is not effective.

The IC card can be an IC card as described above, wherein said IC card has a function which is enabled by a first information and a function which is enabled by a second information, said function which is enabled by said first information is in an unable state in said initial state, and said means for disengaging disengages said unable state of said function through said function which is enabled in response to said predetermined command as said second information.

By providing such IC card described above, the security level of the information access based on the function which is enabled by the second information is set higher than that of the information access based on the function which is enabled by the first information. Accordingly, until the IC card is disengaged from the unable state of the function which is enabled by the first information, the security level of the information access based on the function which is enabled by the first information can be as high as the security level of the information access based on the function which is enabled by the second information.

To achieve the second object described above, the present invention includes a protective method of information in an IC card having a function which is enabled by a predetermined information, wherein said function which is enabled by said predetermined information is in an unable state in an initial state, and said unable state of said function in said initial state is disengaged by a predetermined command at an issuance of said IC card to a user.

To further achieve the third object described above, the present invention includes a personalization system to issue an IC card having a function which is enabled by a predetermined information to a user, wherein said personalization system has a means for providing a predetermined command which disengages said unable state of said function to said IC card of which said function which is enabled by said predetermined information is in an unable state in an initial state, and said IC card is disengaged from said unable state in response to said predetermined command provided by said means for providing a predetermined command. According to the present invention, the IC card having a function which is enabled by a predetermined information, the function being in an unable state, is not disengaged from the unable state of the function which is enabled by a predetermined information unless a predetermined command is provided. Accordingly, if an authority required for using the predetermined command is appropriately controlled, the security of information stored in the IC card can be enhanced from the shipment from the manufacturing plant of the IC card to the beginning of the personalization (issuance) process Other objects, features, and advantages of the present invention will be more apparent from the following detailed description when read in conjunction with the accompanying drawings.

BRIEF DESCRIPTION OF THE DRAWINGS

FIG. 3 is a flowchart showing procedures of an IC card issuance process, for example, relative to an embodiment of the present invention;

FIG. 4 is a flowchart showing procedures, for example, to be followed when the IC card receives a predetermined command;

FIG. 5 is a drawing showing an example of information and authorities required to access to information.

DETAILED DESCRIPTION OF THE PREFERRED EMBODIMENTS

A detailed description of the preferred embodiments of the present invention is now given with reference to the accompanied drawings.

Figure 1:
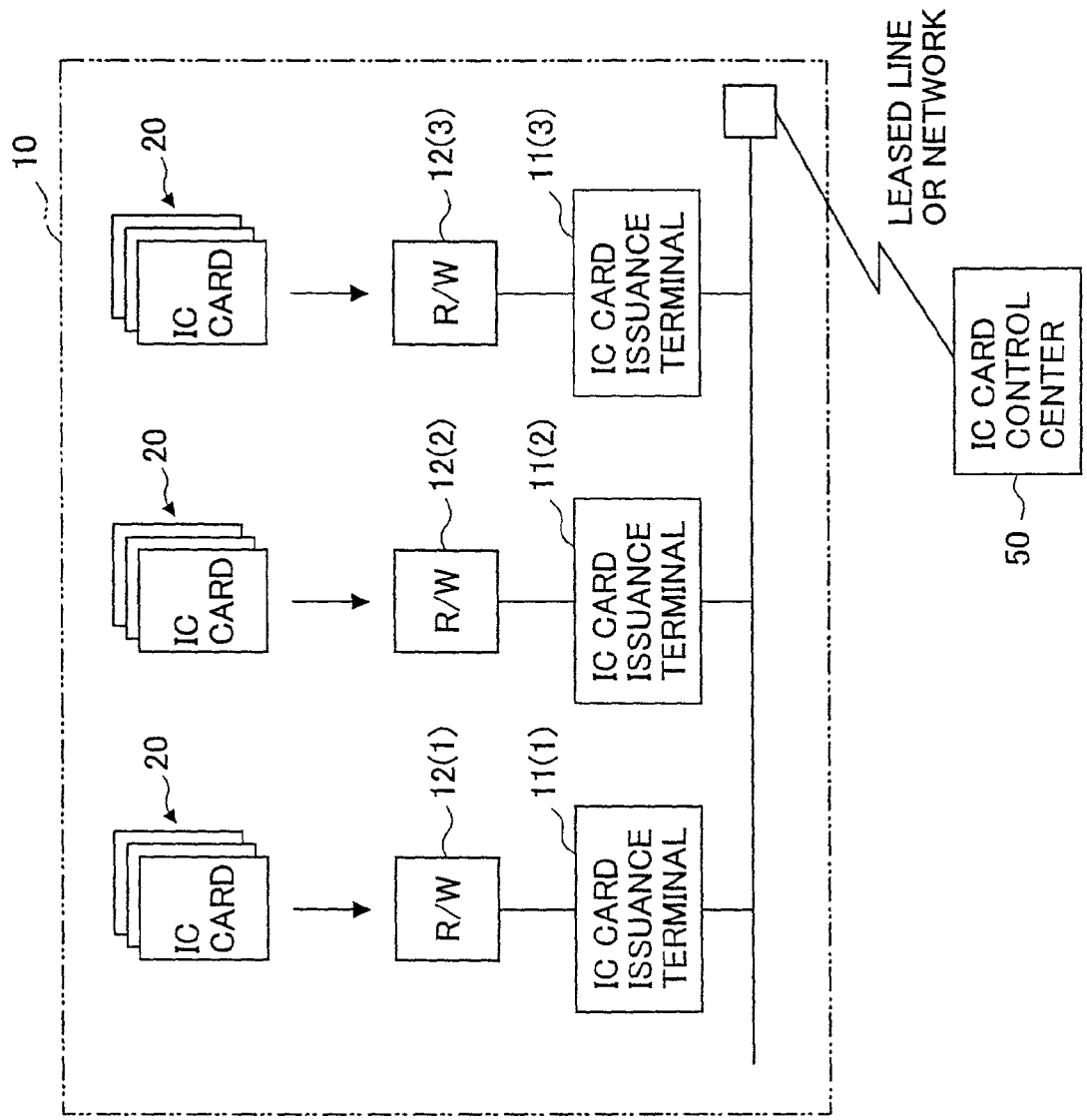
FIG. 1 is a block diagram showing a configuration of an IC card issuance system, for example, for issuing an IC card to users, relative to an embodiment of the present invention.

FIG. 1 is a block diagram showing an IC card issuance system which issues an IC card relative to an embodiment of the present invention.

In FIG. 1, an IC card issuance system 10 which is provided to the sales branches 141, 143, 146, . . . and the agents 143, 146, . . . includes IC card issuance terminals 11(1), 11(2), 11(3) consisting a computer terminal, and read/write units 12(1), 12(2), 12(3) connected thereto. Each IC card issuance terminal 11(1), 11(2), 11(3) is connected to a LAN, and is further connected to an IC card control center 50 through a leased line or a predetermined network. The IC card issuance terminals 11(1), 11(2), 11(3) exchange information with the IC cards 20 set in the read/write unit 12(1), 12(2), 12(3), and write information to the IC cards 20 and read information from the IC cards 20.

Figure 2:
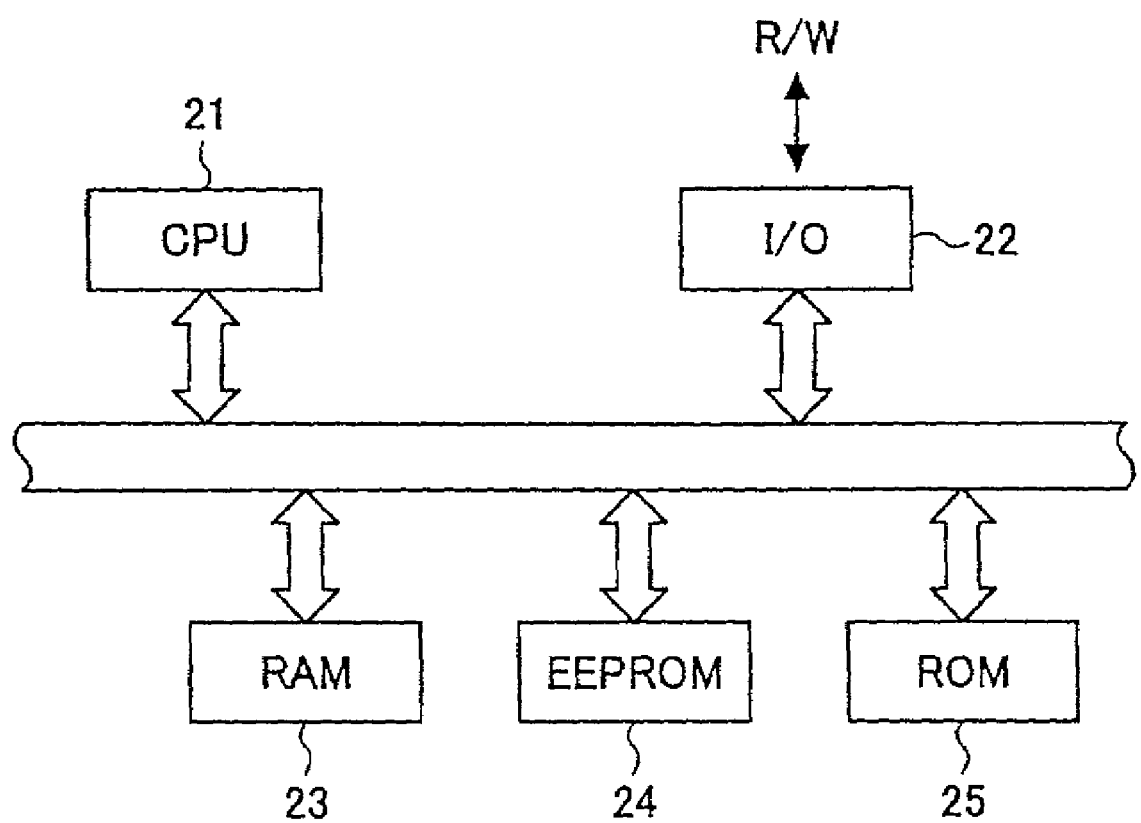
FIG. 2 is a block diagram showing a configuration of the IC card, for example, relative to an embodiment of the present invention.

FIG. 2 is a block diagram showing the IC card 20, for example.

As shown in FIG. 2, each IC card 20 includes a CPU (central processing unit) 21, an interface unit (I/O) 22, a RAM (random access memory) 23, an EEPROM (erasable nonvolatile memory) 24, and ROM (read only memory) 25. These CPU 21, interface unit 22, RAM 23, EEPROM 24, and ROM 25 are connected to a bus. The ROM 25 stores an operating system (OS), and the CPU 21 operates in accordance with the operating system (OS). The interface unit 22 is connected to the read/write unit 12(1). The CPU 21 exchanges information with the IC card issuance terminal 11(1) through the interface unit 22 and the read/write unit 12(1).

The RAM 23 stores information obtained during the operation of the CPU 21. The EEPRQM 24 stores various information necessary for the use of a mobile terminal (International Mobile Subscriber Identity, Emergency Call Codes, Preferred Languages, and Abbreviated dialing numbers, for example, as shown in FIG. 5). This EEPROM 24 further stores a password (PIN) and an unblock password (Unblock PIN, hereinafter referred to as U-PIN).

The CPU 21 receives a password provided from IC card issuance terminal 11(1) through the read/write unit 12(1). If the password is identical to a password stored in the EEPROM 24, the CPU 21 accepts an instruction to perform a function which is permitted to a user authority holder. However, a retry counter (not shown) counts the number of incorrect password inputs. If the number exceeds a predetermined maximum number (the first retry number), the CPU 21 does not accept, whatever is input as a password, any instruction to perform a function which is permitted to a user authority holder (block state).

The IC card is released from the block state provided that, during the block state, another password input from the IC card issuance terminal 11(1) through the read/write unit 12(1) is identical to the unblock password (U-PIN) stored in the EEPROM 24. If the number of incorrect unblock password input exceeds a predetermined maximum number (the second retry number), the release from the block state becomes unable whatever password is input (restricted state).

The manufacturing plant 100 of the IC card 20 includes the ROM 23 storing the operation system (OS) to the IC card 20, and stores, in the EEPROM 24, the abovementioned manufacturing number, an initial value of the password (PIN), an initial value of the unblock password (U-PIN), and a part of information (Preferred Languages information, for example) which can be changed by a function permitted to a user authority holder. An initial value "0" for the first retry number and an initial value "0" for the second retry number are also stored in the EEPROM 24. By setting the first retry number and the second retry number to the common initial value, "0", the IC card is set in a state in which, whatever password is input, any function permitted to the user authority holder is unable to be performed, and is further set in a state in which, whatever unblock password is input, the IC card is unable to be released from the block state.

Figure 6:
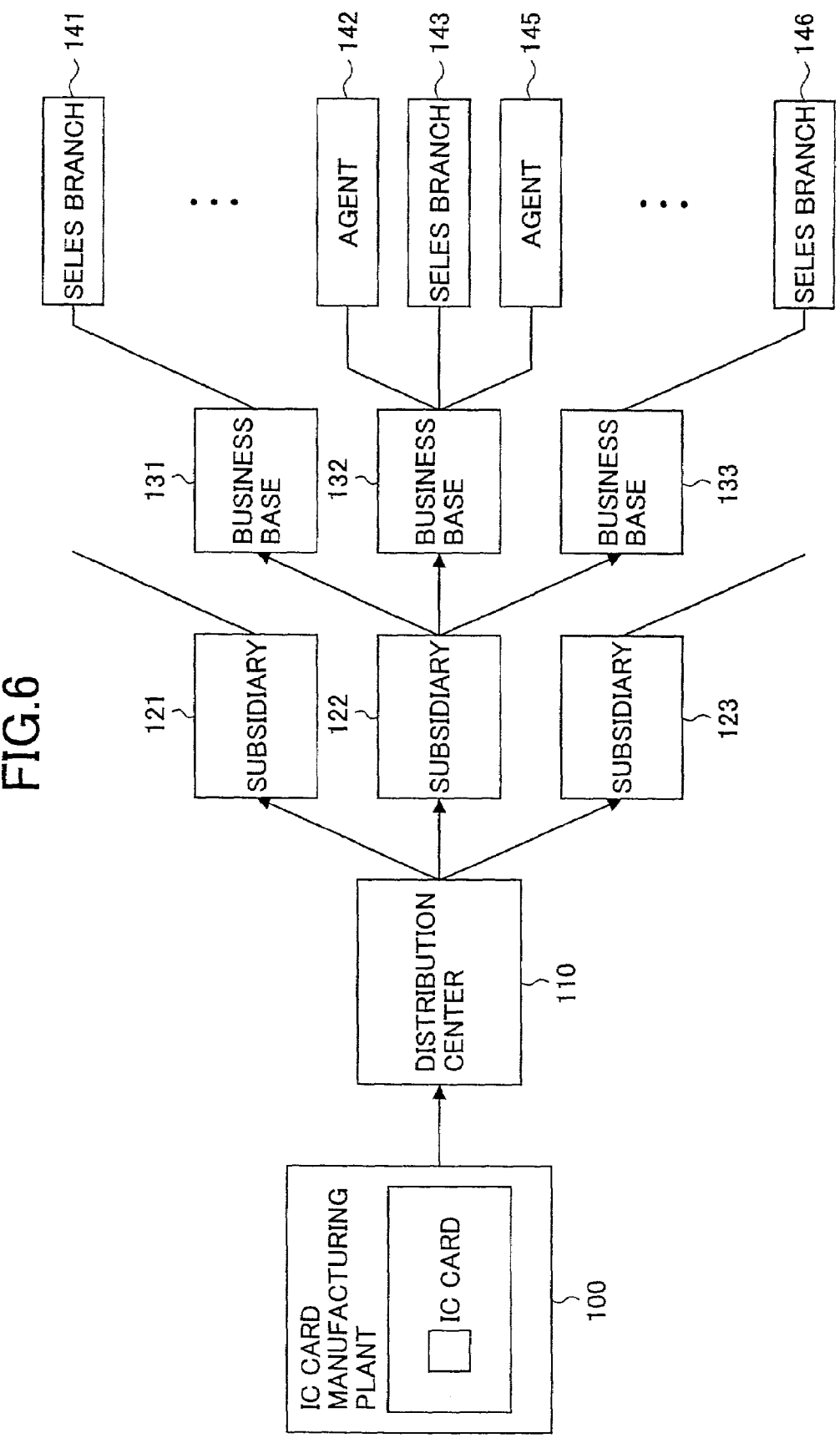
FIG. 6 is a drawing showing an example of a distribution channel of IC cards.

As described above, the IC card 20 which is set in an initial state in which no function is permitted to a user authority holder is delivered from the manufacturing plant 100. Accordingly, during the distribution process of the IC card 20 shown in FIG. 6, nobody can wrongfully alter the information stored in the IC card 20 by inputting a password because the IC card 20 does not accept any instruction to perform a function which is permitted to a user authority holder. The alteration of information is prevented.

The IC card 20 initialized as described above is distributed to the sales branches 141, 143, 146, . . . of the mobile communication provider, and the agents 142, 145, . . . , and is issued to users by the IC card issuance system 10 (shown in FIG. 1).

The IC card issuance terminals 11(1) through 11(3) included in the IC card issuance system 10 perform issuance transactions following the procedure shown in FIG. 3.

As shown in FIG. 3, when the IC card 20 is set in the read/write unit 12(1), the IC card issuance terminal 11(1) controls power supply to the IC card 20 (activating IC card) (S1). The IC card issuance terminal 11(1) and the IC card 20 authenticate each other. After receiving a normal authentication result from the IC card 20 (S2), the IC card issuance terminal 11(1) issues a predetermined administrative command to the IC card 20 (S3). The predetermined command of the user authority is a predetermined command for releasing the IC card from the block state in which any command permitted to the user authority holder is not effective.

When the IC card 20 receives the predetermined command for the user authority issued by the IC card issuance terminal 11(1) through the read/write unit 12(1), the CPU 21 in the IC card 20 perform a process following the procedure shown in FIG. 4.

When the CPU 21 receives a command issued by the IC card issuance terminal 11(1) through the interface unit 22, the CPU 21 checks whether the command has a predetermined form as a user authority command (S11), and further checks whether a predetermined condition of command issuance is satisfied (S12). The CPU 21 yet further checks whether processes based on the password (PIN) and the unblock password (U-PIN) are locked, in the other words, whether the first retry number and the second retry number are set "0" (zero) (S13). If the CPU 21 determines that all conditions are satisfied (YES for the processes S11, S12, and S13), the CPU 21 resets, to predetermined numbers, the first retry number and the second retry number with which the retry counters are compared (S14).

The first retry number is, as described above, a maximum number of inputs of incorrect passwords which differ from the password (PIN) stored in the EEPROM 24, and is set to a predetermined number of the system. The second retry number is, as described above, a maximum number of inputs of incorrect unlock passwords which differ from the unlock password (U-PIN) stored in the EEPROM 24, and is also set to another predetermined number of the system. Since the first retry number and the second retry number are reset to predetermined numbers, the IC card 20 is set to a state where the CPU 21 can perform processes permitted to the user authority holder (unblock).

When the first retry number and the second retry number are reset, in other words, the IC card 20 is released from the block state where processes based on the password (PIN) and the unblock password (U-PIN) are locked, information that the process based on the predetermined command is performed normally is transferred to the IC card issuance terminal 11(1) through the interface unit 22 and the read/write unit 12(1) (S15). If any condition is not satisfied at the decisions S11, S12, and S13, an error message against the predetermined command is transferred to the IC card issuance terminal 11(1) from the IC card 20 (S16).

A description of the procedure continues with reference to FIG. 3. After issuing the predetermined command of the administrative authority (S3), the IC card issuance terminal 11(1) receives information that the process based on the predetermined command has performed normally from the IC card 20 through the read/write unit 12(1), and recognizes that the IC card 20 has been released from the block state where no process permitted to the user authority holder can be performed (S4). The IC card issuance terminal 11(1) performs the other transactions necessary for the IC card issuance, such as storage of International Mobile Subscriber Identity to the EEPROM 24 (S5). When all predetermined process for the IC card issuance is over, the IC card issuance terminal 11(1) turns off the power supply to the IC card 20 (inactivation of IC card) (S6).

The IC card 20 is pulled out of the read/write unit 12(1), and is given to a user after predetermined office procedure. The user, after setting the IC card to a predetermined mobile terminal (a mobile phone, for example), starts receiving a communication service based on the information, such as International Mobile Subscriber Identity, stored in the IC card 20.

Because of the procedures performed at the initial shipment from the manufacturing plant and the issuance to the user, as described above, the IC card 20 is set, during the distribution period until the issuance process to the user begins, to the block state in which no function permitted to a user authority holder can be performed unless the predetermined command of the administrative authority is input. Accordingly, unless the issuance process is performed for the user, the information stored in the IC card 20, which can be accessed by a user authority holder, is protected at the security level as high as that of the administrative authority.

The preferred embodiments of the present invention are described above. The present invention is not limited to these embodiments, but various variations and modifications may be made without departing from the scope of the present invention. This patent application is based on Japanese priority patent application No. 2000-379346 filed on Dec. 13, 2000, the entire contents of which are hereby incorporated by reference.

What is claimed is:

1. An IC card, comprising:
a controller that can accept, in response to receipt of correct first information, an instruction to perform a function, wherein said controller can set, in response to receipt of incorrect first information, the IC card in a block state where said controller does not accept the instruction;
while in the block state, said controller can release, in response to receipt of correct second information, the IC card from the block state;
said controller can further set, in response to receipt of incorrect second information, the IC card in a restricted state where said controller can not release the IC card from the block state; and
while in the restricted state, said controller can set, in response to receipt of a predetermined command, the IC card in an unblock state where said controller can accept the instruction; and
the IC card is initially set in the restricted state for security at a manufacturing plant of the IC card.

2. The IC card is claimed in claim 1, wherein the predetermined command is protected at administrator security level.

3. The IC card as claimed in claim 1, wherein said controller sets the IC card in the block state when a first retry counter becomes a first predetermined value; and
said controller sets the IC card in the restricted state when a second retry counter becomes a second predetermined value.

4. The IC card as claimed in claim 3, wherein the IC card is set in the block state and the restricted state when the IC card is shipped from the manufacturer of the IC card by setting respective retry counters at the respective predetermined values.

5. A method of protecting information stored in an IC card, the method comprising the steps of:
setting, in response to receipt of incorrect first information, the IC card in a block state where an instruction to perform a function is not accept;
while in the block state, releasing, in response to receipt of correct second information, the IC card from the block state;
while in the block state, setting, in response to receipt of incorrect second information, the IC card in a restricted state where the IC card can not be released from the block state; and
while in the restricted state, in response to receipt of a predetermined command, setting the IC card in an unblock state where the instruction can be accepted; and
the IC card is initially set in the restricted state for security at a manufacturing plant of the IC card.

6. The method as claimed in claim 5, wherein the predetermined command is protected at administrator security level.

7. The method as claimed in claim 5, wherein the IC card is set in the block state when a retry counter becomes a first predetermined value; and
the IC card is set in the restricted state when a second retry counter becomes a second predetermined value.

8. The method as claimed in claim 7, wherein the IC card is set in the block state and the restricted state when the IC card is shipped from the manufacturer of the IC card by setting respective retry counters at the respective predetermined values.

9. An IC card issuance apparatus comprising:
a terminal configured to disperse an IC card that includes a controller that can accept, in response to receipt of correct first information, an instruction to perform a function, wherein said controller can set, in response to receipt of incorrect first information, the IC card in a block state where said controller does not accept the instruction;
while in the block state, said controller can release, in response to receipt of correct second information, the IC card from the block state;
said controller can further set, in response to receipt of incorrect second information, the IC card in a restricted state where said controller can not release the IC card from the block state; and
while in the restricted state, said controller can set, in response to receipt of a predetermined command, the IC card in an unblock state where said controller can accept the instruction;
a command providing unit configured to provide the predetermined command to the IC card thereby to set the IC card in the unblock state; and
the IC card is initially set in the restricted state for security at a manufacturing plant of the IC card.

10. The IC Card issuance apparatus as claimed in claim 9, wherein the function of the IC card is enabled when the command is provided from said command providing unit to the IC card.

11. The IC card issuance apparatus as claimed in claim 9, wherein the command is protected at administrator security level.

* * * * *